Aug. 12, 1947.  J. D. THRESS  2,425,706
FREIGHT CAR TRUCK ASSEMBLY HOOK DEVICE
Filed Feb. 3, 1944  3 Sheets-Sheet 1
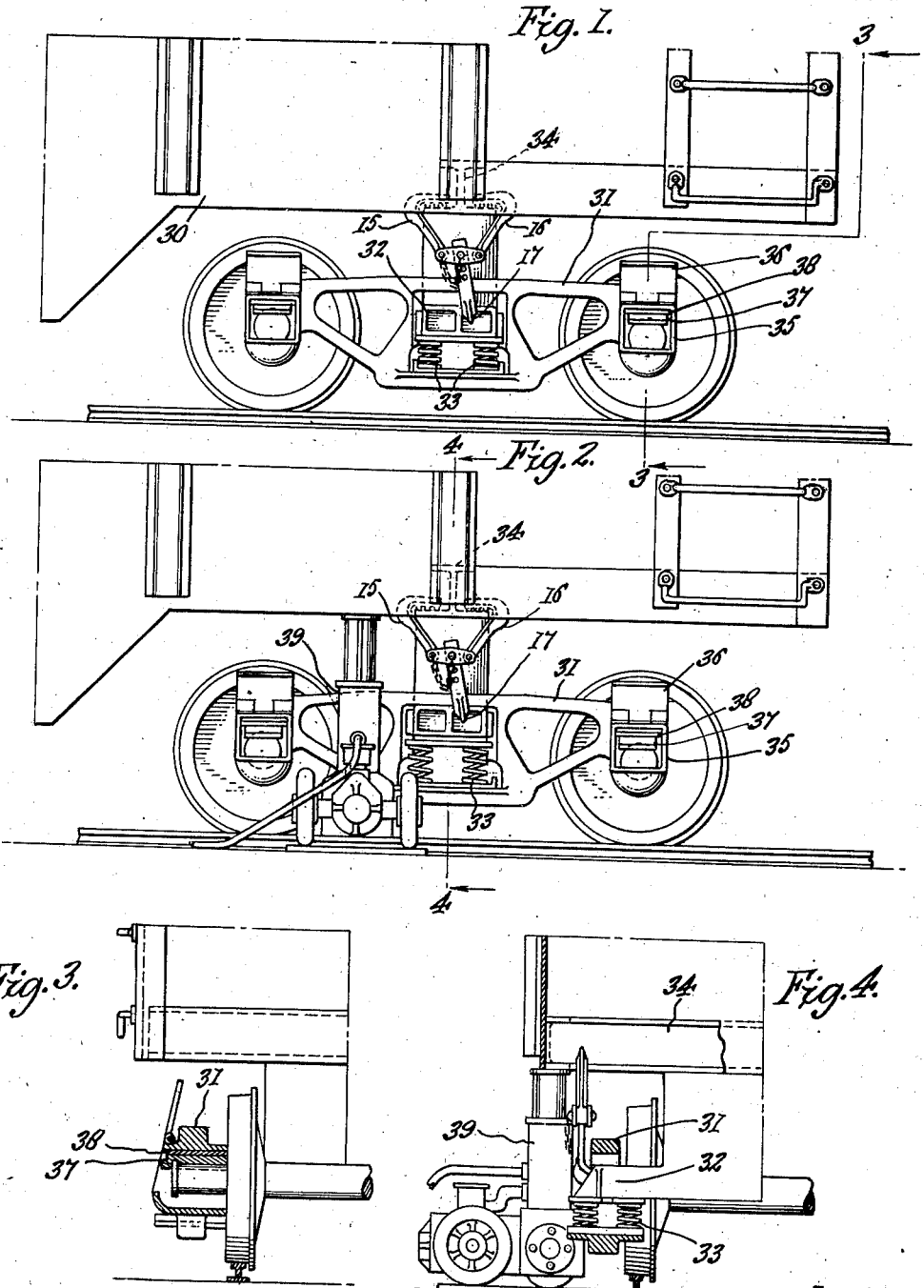
Inventor
J. D. Thress
By Mawhinney & Mawhinney
Attorneys Aug. 12, 1947.  J. D. THRESS  2,425,706
FREIGHT CAR TRUCK ASSEMBLY HOOK DEVICE
Filed Feb. 3, 1944  3 Sheets-Sheet 2
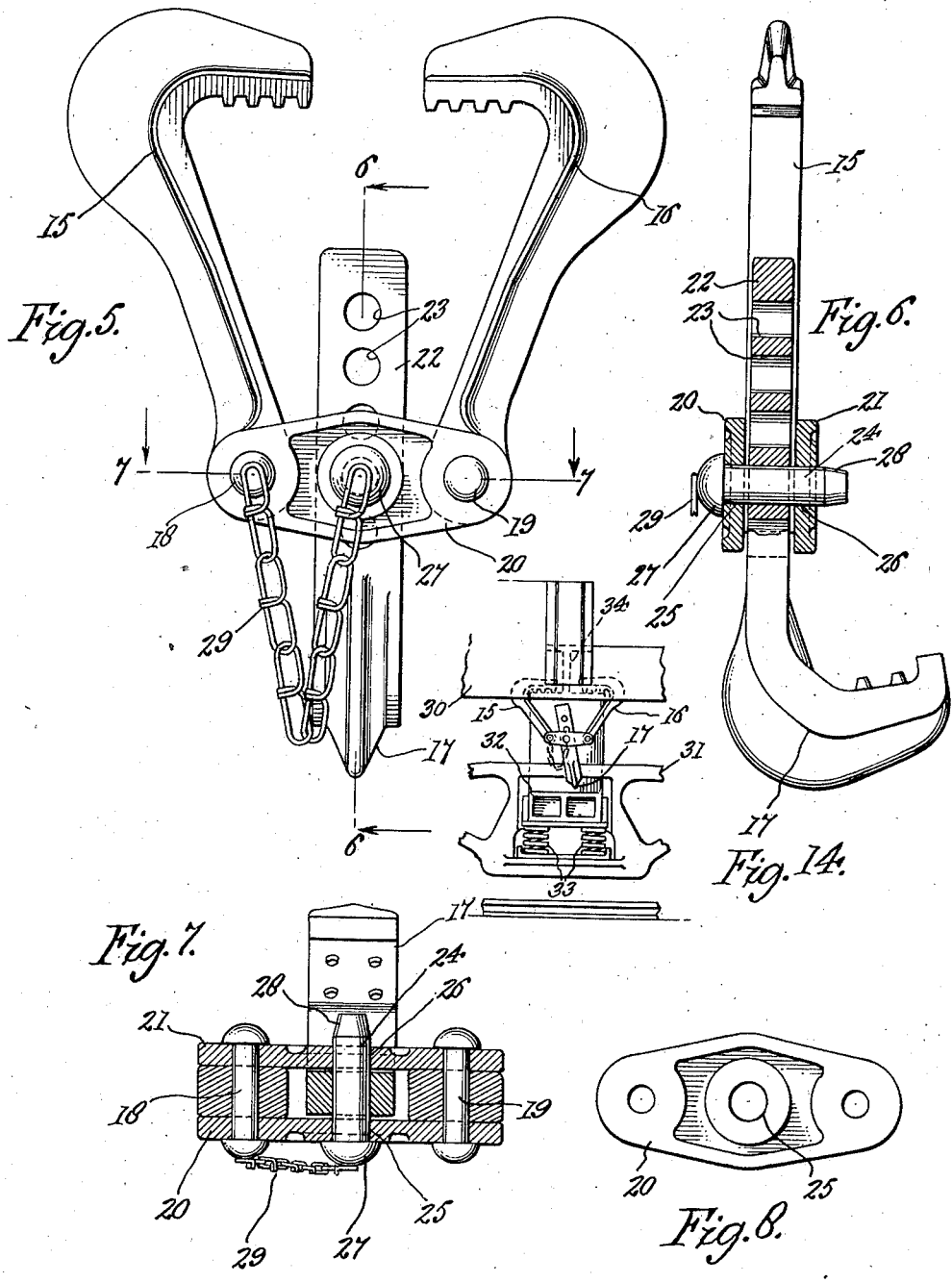
Inventor
J. D. Thress
By Mawhinney & Mawhinney
Attorneys

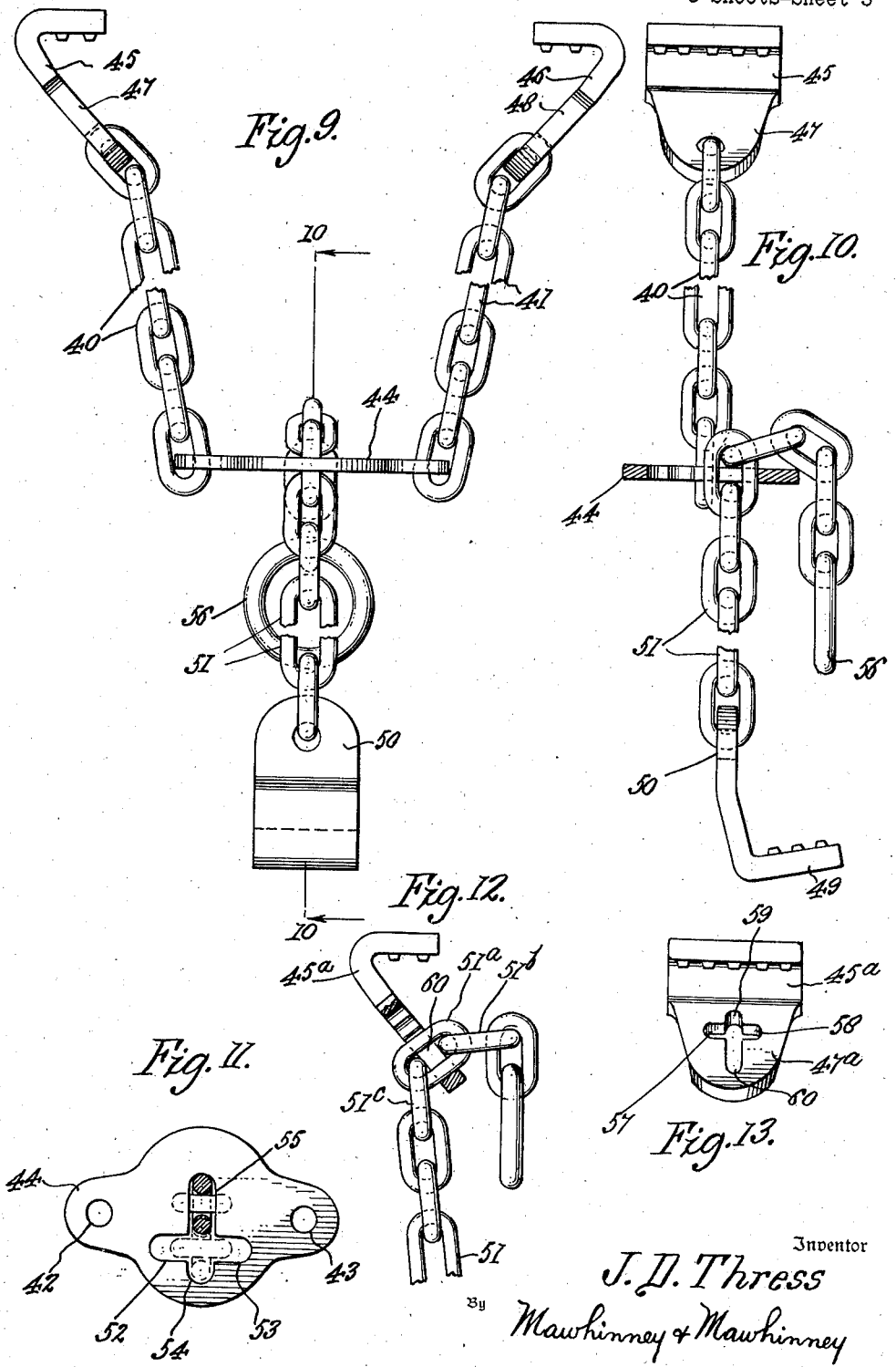

Patented Aug. 12, 1947

2,425,706

UNITED STATES PATENT OFFICE 2,425,706

FREIGHT CAR TRUCK ASSEMBLY HOOK DEVICE

James D. Thress, Roanoke, Va., assignor to Charles M. O'Boyle, Wilmington, Del.

Application February 3, 1944, Serial No. 520,939

11 Claims. (Cl. 104—32)

The present invention relates to improvements in freight car truck assembly hook device, and consists more particularly in a device to couple the body and truck frame together whereby when the body is jacked up to lift its weight off the truck the truck frame will also be raised to remove its weight from the wedges and brasses in the journal box.

The American Association of Railroads has promulgated certain rules with reference to care and maintenance of railroad equipment. Rule 66 requires that all journal boxes be repacked every fifteen months. In order to perform this work the prevailing practice is to first jack the car body up off the trucks, and then in separate operations at the sides of each truck to jack up each journal box. Then only may the journal box wedges and bearings be removed for testing, replacement and necessary substitutions.

The present invention aims to provide a lifting device so designed as to eliminate all jacking except the initial jacking of the car body.

A further object of the invention is to provide a simple form of lifting device constructed with a view to its ready application to the cross bolster of the freight car body and to the side frame or bolster of the truck, and in which a high safety factor is involved in that the device is constructed for effectively grabbing the necessary parts without risk of the device failing to take hold or slipping off when the weight of the truck frame is imposed thereon.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a fragmentary side view of an end portion of the railway car showing the initial application of the lifting device according to the present invention.

Figure 2 is a similar view showing the jacked up car body and entrained truck bolster and side frame and with the journal box lids raised and the wedges partly removed.

Figure 3 is a vertical section taken on the line 3—3 of Figure 1.

Figure 4 is a similar section on the line 4—4 of Figure 2.

Figure 5 is a side elevation, taken on an enlarged scale, of one form of the lifting device removed from the car body and truck.

Figure 6 is a vertical section taken on the line 6—6 of Figure 5.

Figure 7 is a cross section taken on the line 7—7 of Figure 5.

Figure 8 is a side view of one of the cross plates.

Figure 9 is a side elevation of a modified form of device.

Figure 10 is an edge view of the same with the center plate shown in section, on the line 10—10 of Figure 9.

Figure 11 is a plan view of the center cross plate showing in full and dotted lines the two positions of the chain.

Figure 12 is a fragmentary side elevation, with parts shown in section, of a further modified form of the device.

Figure 13 is a plan view of one of the car body bolster hooks according to Figure 12, and Figure 14 is a view similar to Figure 1 with the lower hook engaged in the truck side frame rather than in the truck bolster.

Referring more particularly to the drawings and for the present to that form of the invention shown in Figures 5 to 8 inclusive, 15 and 16 designate two body bolster hooks and 17 represents a single truck frame hook faced at substantially right angles to the companion hooks 15 and 16. The hooks 15 and 16 swing freely on pivots 18 and 19 riveted or otherwise secured in cross bars 20 and 21. These cross bars 20 and 21 are held in spaced parallel relation by the bearings of the hooks 15 and 16 and also by the adjustable shank 22 of the lower hook 17. A series of holes 23 in the shank 22 selectively receive a removable pin 24 which is slidably received through openings 25 and 26 in the bars 20 and 21 respectively. The pin 24 is headed at one end 27 and is tapered at its other end 28 to facilitate insertion. The pin 24 is held captive against loss by a chain 29, the ends of which are welded respectively to the head 27 of removable pin 24 and the head of one of the pivot pins 18. The chain 27 also forms a convenient handle by which the pin 24 may be withdrawn and inserted.

The hooks 15, 16 and 17 will preferably be roughened on their engaging faces, provided with suitable teeth or otherwise shaped to afford good purchase upon the bolster and truck frame parts.

Referring more particularly to Figures 1 to 4 inclusive of the drawings, 30 designates generally a railway freight car, 31 the truck side frame and 32 the truck bolster, which is shown supported on the springs 33. The body bolster 34 is of usual I-beam cross section.

The journal boxes are indicated at 35 with their lids 36 in the raised position. The brasses or bearings are indicated at 37 and the wedges at 38.

In the use of the device the hooks 15 and 16 are engaged with the opposite lower flanges of the car bolster 34 as shown in Figures 1, 2 and 4 with the lower hook 17 engaging either the truck bolster 32 or directly the truck side frame 31.

An air or other jack is engaged beneath the car body 30, as for instance in the position shown in Figure 2, where the car body is shown as having been raised by this jack 39. In the act of raising the body 30, due to the hook lifting device, the truck side frame 31 is also raised either directly or through the truck bolster 32 a sufficient distance to remove the weight of the truck frame from the brasses 37 and the wedges 38. The lids 36 are raised and the waste removed from the journal boxes before the car is jacked. However, same can be removed after jacking the car. After the brasses or bearings have been sound tested they are replaced or discarded in favor of new brasses. The wedges are put in place, the journal boxes stuffed with waste, lubricated and afterwards the weight of the car body 30 is allowed to descend upon the springs and the trucks. The adjustment of the shank 22 will be so made that there will be slack in the lifting device for ease in its initial application and for ease in its removal after the job is performed. This slack is also desirable to allow the springs 33 to expand upwardly as the weight of the car body is lifted off the same. Whereas the car body 30 must be lifted through a considerable linear vertical distance to remove its weight completely from the trucks, when the latter is accomplished it is only necessary to lift the truck frames 31 a slight distance to relieve their weight from the brasses and wedges sufficiently to allow of the removal of the same. Consequently a certain slack is desirable in the improved lifting device in order to enable a high rise of the car body 30 before the lifting device picks up the truck frame 31.

A satisfactory form of the device has been made in which the hooks 15 and 16 are 1½ inches wide and 1 inch thick by 13 inches long. The lower adjustable hook 17 is 1½ inches wide, 1 inch thick by 12 inches long. When the car is jacked with this device in place it lifts the truck bolsters, side frame and journal boxes sufficient to remove the journal wedges, bearing truck springs, shims, etc., without the necessity of additional jacking of the journal boxes, thus saving over fifty percent of the labor required to perform this operation. Moreover the present device can be used with perfect safety to the workmen as there is no chance of it slipping and catching his hand.

Referring more particularly to Figures 9 to 13 inclusive of the drawings, a chain form of device is shown in which upper chains 40 and 41 are connected to openings 42 and 43 of the central cross bar or frame 44. The body bolster hooks 45 and 46 have perforated webs 47 and 48 to receive the upper end links of the chains 40, 41.

The lower truck frame hook 49 has a perforated web 50 to flexibly receive one end link of a chain 51. This chain is adapted to adjustably engage the frame plate 44 which is provided with a cross slot for this purpose, such cross slot being composed of the mutual opposed branches 52 and 53, the short branch 54 and the long branch 55, the latter two branches being alined and extending at substantially right angles to the alined mutual slots 52 and 53. The width of the branches is that of the flatwise dimension of a chain link which is shown in cross section in Figure 11 as occupying the long branch or slot 55. When the chain extends crosswise of the slot it is wider than such slot or branch and the ends of the crosswise link abut against the plate or frame 44 so as to prevent the chain being pulled through the frame 44. By shifting the chain from the cross sectional position shown in Figure 11 to the cross slot, the crosswise links will be able to move up and down in the mutual branches 52 and 53 while the flatwise links move up and down in the branches 54 and 55. Thus the chain may be pulled through the plate or frame 44 to either raise or lower the attached lower hook 49. An enlarged ring 56 at the upper end of the chain 51 prevents the chain from being pulled all the way through the frame plate 44 and at the same time forms a convenient means for raising or lowering the chain 51 through the plate 44 as well as of carrying the entire device when moving from one car to another.

Referring more particularly to Figures 12 and 13, the same form of cross slot adjustment as heretofore described may also be provided for the upper car bolster hooks 45$^a$, in the webs 47$^a$ of which are cross slots consisting of branches 57, 58, 59 and 60 similar to the branches shown in Figure 11 and of which 59 is the short and 60 the long branch.

Figure 12 shows a link 51$^a$ of the chain 51 as lying flatwise in the long branch 60 with the mutual ends of adjacent links 51$^b$ and 51$^c$ abutting against the upper and lower surfaces of the web 47$^a$ and extending crosswise of the long slot 60 so as to prevent the chain being pulled in either direction through the web 47$^a$. This form of the invention affords adjustment not only of the lower hook 49 but also of the upper hook and such upper hooks may be individually adjusted independently of one another. The chain device may be carried and transported very conveniently.

The present device is used not only for the purpose of removing wedges and brasses but also to raise the truck bolster for the removal of springs and to dismantle the truck.

It is obvious that various changes and modifications may be made in the details of construction and design of the above specifically described embodiment of this invention without departing from the spirit thereof, such changes and modifications being restricted only by the scope of the following claims.

What is claimed is:

1. In combination with a railway car having a transversely extending body bolster and a truck supporting the car body and having side frames resting upon the journals of the car axles with the intermediate portion of the side frames below said bolster and with such intermediate portions of the side frames having open areas below bar portions of the frames, an improved device of the kind described comprising means for coming together in opposite directions upon said body bolster, a second means pivotally carried by said first means and adapted to swing in the direction of the length of the car body, said second means having a part constructed and arranged to enter said open area and to engage said bar portion of a truck side frame.

2. In a device for connecting a truck side frame to a car body of a railway car to raise the truck frame off the journals when the car body is jacked up wherein an open area below a bar portion at the intermediate part of the side frame receives an end portion of the truck bolster, means constructed and arranged to lie exteriorly of the truck frame and having a part inturned therefrom to engage in said area and beneath said bar portion, and means connected to said first named means and extending upwardly therefrom and having parts for detachably engaging with a part of the car body to cause lifting of the entrained means and truck frame with the car body.

3. In combination with a railroad car having a body bolster and a truck having side frames supported on the journals of the car axles, a device for lifting the truck frames when the car body is jacked up comprising a pair of hooks having mutually inturned bills to engage said body bolster, a frame to which said hooks are pivoted, a shank pivoted in said frame to swing substantially longitudinally of the car and having a hook extending inwardly at substantially right angles to the direction of said bills to engage an intermediate part of the truck frame.

4. In combination with a body bolster of a car body and a truck frame having below said bolster an intermediate part with an open area below a bar portion, a device of the kind described comprising a pair of complemental hooks having mutually inturned substantially horizontal bills for engaging and support upon said body bolster, said hooks having downwardly divergent shanks, a frame to which said shanks are pivoted, a third hook having a shank slidable upwardly through said frame between the pivots and shanks of the two first mentioned hooks, means for detachably and selectively holding said last named shank at various elevations in said frame, and an inturned hook on the lower end portion of said adjustable shank extending at substantially right angles to the directions of the bills of the first named hooks and occupying said open area of the frame and engaging beneath the bar portion of the frame.

5. In combination with a body bolster of a car body and a truck frame having below said body bolster an intermediate part with an open area below a bar portion, a device of the kind described comprising a frame composed of separated substantially parallel bars, three shanks pivoted between said bars to swing in substantially vertical planes with two shanks at the ends of the bars and one shank between such other shanks and having its pivot removable to permit adjustment vertically of the intermediate shank, mutually inturned hooks on the free ends of the outer shanks for engaging the body bolster, and a hook on the lower part of the intermediate shank for engaging the bar portion of the truck frame.

6. In combination with a body bolster of a car body and a truck frame having below said body bolster an intermediate part with an open area below a bar portion, a device of the kind described comprising three hooks, two of such hooks being opposed and adapted to engage at opposite sides of said body bolster, a third hook extending at substantially right angles to and below said first pair of hooks for engaging said truck frame, chains coupled individually to all of said hooks, a plate to opposite end portions of which the two chains of the first two hooks are pivotally connected at their lower end portions, said plate having an intermediate cruciform slot with one side longer than the other three sides, and a chain having links just sufficiently wide to be slidingly received through said cruciform slot to enable the chain to be shifted into the longer side of the cruciform slot with links of the chain engaging above and below said plate to hold the chain in adjusted position against movement through said plate.

7. For use with a railway car transverse metallic body bolster of substantially I-beam form having oppositely projecting substantially horizontal flanges and a truck side frame having an intermediate part substantially below said beam with a transverse opening therethrough and a bar portion above the opening, a detachable device for coupling the car body to the frame for lifting the frame when the car body is jacked up comprising a pair of hooks having bills on their upper portions mutually inturned horizontally with relatively large substantially horizontal under surfaces for engaging over the upper portions of the flanges of the I-beam, substantially parallel spaced cross bars receiving therebetween the lower portions of the hooks, substantially horizontally spaced pivots for pivoting opposite end portions of said bars independently to said hooks, a shank adjustably mounted between the intermediate portions of said cross bars and between the lower portions of said hooks, said shank having a series of perforations therein, said cross bars having intermediate registering perforations adapted to align selectively with the perforations of said shank, a pin adapted to pass through such aligned perforations, and a third hook on the lower portion of said shank having a bill portion turned at substantially right angles to the direction of the bills of the first mentioned hooks, said third hook having its upper surface constructed and arranged to enter the opening and engage beneath the bar of the said frame.

8. For use with a railway car transverse metallic body bolster of substantially I-beam form having oppositely projecting substantially horizontal flanges and a truck side frame having an intermediate part substantially below said beam with a transverse opening therethrough and a bar portion above the opening, a detachable device for coupling the car body to the frame for lifting the frame when the car body is jacked up comprising a pair of spaced bars having substantial horizontal elongation, a pair of hooks having shank portions pivoted at horizontally spaced points between the end portions of said bars to swing independently in a vertical plane, said hooks having mutually inturned substantially horizontal bills of substantial horizontal extent along their lower faces to engage relatively wide areas of the flanges of such beam in the hanging support of the device from the beam before tension is put thereupon, a third shank vertically movable between the intermediate portions of the bars and between the pivoted parts of the hooks, means captive to the device to hold the third shank in vertically adjusted position between said bars, and a third hook on the lower portion of said third shank inturned at substantially right angles to the direction of the bills of the two first mentioned hooks and adapted to pass into the opening in the intermediate part of the side frame, said third hook having its inturned edge adapted to engage the cross bar of the side frame.

9. For use with a railway car transverse metallic body bolster of substantially I-beam form having oppositely projecting substantially horizontal flanges and a truck side frame having an intermediate part substantially below said beam with a transverse opening therethrough and a bar portion above the opening, a detachable device for coupling the car body to the frame for lifting the frame when the car body is jacked up comprising a frame of substantial horizontal elongation, upper hooks having shanks pivoted at their lower portions to opposite end portions of said frame and having mutually inturned bills with lower faces having substantial horizontal extent for resting directly upon the flanges of the beam, a third hook having a shank adjustably mounted in an intermediate part of said frame and having a bill extending from the lower portion thereof in a direction substantially at right angles to the direction of the first mentioned bills whereby to enter the opening in the intermediate part of the frame, said third bill being constructed and arranged as to its upper face to engage the bar of the side frame.

10. For use with a railway car transverse metallic body bolster of substantially I-beam form having oppositely projecting substantially horizontal flanges and a truck side frame having an intermediate part substantially below said beam with a transverse opening therethrough and a bar portion above the opening, a detachable device for coupling the car body to the frame for incidentally lifting the frame when the car body is jacked up comprising a combination of three hooks and means to connect said hooks together, two of said hooks constituting an upper pair and being pivoted to said means at their lower portions and having at their upper portions mutually inturned bills having extensive lower substantially horizontal faces adapted to seat throughout large areas of the beam flanges, the third hook having a bill extending at substantially right angles to the first mentioned bills and having a substantially horizontal upper surface adapted to enter the opening in the intermediate portion of the side frame and to engage beneath the bar of the side frame.

11. An improved device as claimed in claim 10 characterized by the fact that the pivot points of the two upper hooks are so related to the under horizontal surfaces of the bills of said upper hooks that the device may be supported by the upper hooks from the I-beam while in slack condition before the weight of the side frame is assumed by the third lower hook.

JAMES D. THRESS.

REFERENCES CITED

The following references are of record in the file of this patent:

UNITED STATES PATENTS

| Number | Name | Date |
|---|---|---|
| 538,661 | Davis | May 7, 1895 |
| 1,241,638 | Laughlin et al. | Oct. 2, 1917 |
| 1,498,494 | Turner | June 17, 1924 |
| 69,992 | Hawley | Oct. 22, 1867 |
| 306,067 | Durning | Oct. 7, 1884 |

OTHER REFERENCES

1931 Car Builder's Cyclopedia, page 1148, Figure 3221.